(12) United States Patent
Kim et al.

(10) Patent No.: US 10,312,634 B2
(45) Date of Patent: Jun. 4, 2019

(54) ELECTRONIC DEVICE CARD SOCKET

(71) Applicants: Molex, LLC, Lisle, IL (US); Eun Guk Kim, Ansan (KR); In Chull Yang, Ansan (KR); Jeong Yong Park, Ansan (KR)

(72) Inventors: Eun Guk Kim, Ansan (KR); In Chull Yang, Ansan (KR); Jeong Yong Park, Ansan (KR)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/574,087

(22) PCT Filed: Jun. 15, 2016

(86) PCT No.: PCT/KR2016/006377
§ 371 (c)(1),
(2) Date: Nov. 14, 2017

(87) PCT Pub. No.: WO2016/204521
PCT Pub. Date: Dec. 22, 2016

(65) Prior Publication Data
US 2018/0183181 A1   Jun. 28, 2018

(30) Foreign Application Priority Data
Jun. 15, 2015 (KR) .......................... 10-2015-0084209

(51) Int. Cl.
*G06K 13/08* (2006.01)
*H01R 12/71* (2011.01)
(Continued)

(52) U.S. Cl.
CPC ............. *H01R 13/635* (2013.01); *G06K 7/00* (2013.01); *G06K 13/0806* (2013.01);
(Continued)

(58) Field of Classification Search
CPC ........ H01R 13/635; H01R 12/71; G06K 7/00; G06K 13/0806; G06K 13/0831; H04B 1/3816
See application file for complete search history.

(56) References Cited

U.S. PATENT DOCUMENTS 5,684,655 A * 11/1997 Fujimura ........... G06K 13/0806
360/97.11
5,899,763 A * 5/1999 Kajiura ................ G06K 7/0047
439/159

(Continued)

FOREIGN PATENT DOCUMENTS

JP           3189195 U       2/2014
KR     2013-0096806 A       9/2013
(Continued)

*Primary Examiner* — Edwin A. Leon
*Assistant Examiner* — Oscar C Jimenez
(74) *Attorney, Agent, or Firm* — Molex, LLC

(57) ABSTRACT

Disclosed is an electronic device card socket capable of preventing the breakage of a hinge and preventing noise (static), which is caused by movement between respective parts, in the tray-type card socket. The electronic device card socket according to one embodiment of the present disclosure includes a socket housing, a socket cover, an ejecting hinge part, and ejecting bar, and a movement preventing means. The socket housing has a space into which a tray equipped with a card is inserted. The socket cover is provided at the upper part of the socket housing. The ejecting hinge part is rotatably hinge-coupled to one side of the socket housing so as to push the tray forward and separate the same when the ejecting hinge part rotates. The ejecting bar is provided at the other side of the socket housing so as to move in the forward and backward directions, and is connected to the ejecting hinge part so as to rotate the ejecting hinge part when the ejecting bar moves forward and backward. The movement preventing means
(Continued)

prevents the movement of the ejecting hinge part and/or the ejecting bar when vibration is generated between the parts of the card socket.

6 Claims, 8 Drawing Sheets

(51) Int. Cl.
   *H01R 13/635* (2006.01)
   *H04B 1/3816* (2015.01)
   *G06K 7/00* (2006.01)
(52) U.S. Cl.
   CPC ......... *G06K 13/0831* (2013.01); *H01R 12/71* (2013.01); *H04B 1/3816* (2013.01)

(56) References Cited

U.S. PATENT DOCUMENTS

| | | | | |
|---|---|---|---|---|
| 6,017,230 A * | 1/2000 | Yao | ................ | G11B 33/122 439/159 |
| 6,042,403 A * | 3/2000 | Nishioka | ................ | G06K 13/08 439/159 |
| 6,042,404 A * | 3/2000 | Lai | ................ | G06K 13/08 439/159 |
| 6,059,589 A * | 5/2000 | Nishioka | ................ | G06K 13/08 439/159 |
| 6,095,835 A * | 8/2000 | Oguchi | ................ | G06K 13/08 439/159 |
| 6,120,309 A * | 9/2000 | Hara | ................ | H01R 13/6335 439/157 |
| 6,155,853 A * | 12/2000 | Kajiura | ................ | G06K 7/0047 439/159 |
| 6,210,188 B1 * | 4/2001 | Chang | ................ | G06K 13/08 439/159 |
| 6,338,636 B2 * | 1/2002 | Nishioka | ................ | G06K 13/08 439/157 |
| 6,340,305 B1 * | 1/2002 | Liu | ................ | H01R 13/6335 439/159 |
| 6,364,674 B1 * | 4/2002 | Kajiura | ................ | G06K 13/08 439/159 |
| 6,379,167 B1 * | 4/2002 | Zhang | ................ | G06K 13/08 439/157 |
| 6,587,350 B1 * | 7/2003 | Lin | ................ | H05K 7/1411 361/754 |
| 7,374,442 B2 * | 5/2008 | Anzai | ................ | H01R 13/641 439/188 |
| 7,484,976 B2 | 2/2009 | Ezaki | | |
| 8,734,188 B2 * | 5/2014 | Nakase | ................ | G06K 13/0831 439/159 |
| 8,740,635 B2 * | 6/2014 | Lim | ................ | G06K 13/08 439/159 |
| 9,543,999 B2 * | 1/2017 | Kusuhara | ................ | H01R 13/2442 |
| 2008/0304239 A1 * | 12/2008 | Cheng | ................ | G06K 13/08 361/726 |
| 2013/0005167 A1 * | 1/2013 | Matsumoto | ................ | H01R 12/7094 439/159 |
| 2014/0273564 A1 * | 9/2014 | Matsumoto | ................ | G06K 13/0812 439/153 |
| 2015/0072549 A1 * | 3/2015 | Okoshi | ................ | H01R 13/633 439/160 |

FOREIGN PATENT DOCUMENTS

| | | |
|---|---|---|
| KR | 10-1366182 B1 | 2/2014 |
| KR | 2014-0024167 A | 2/2014 |
| KR | 10-1468955 B1 | 12/2014 |
| KR | 10-1468956 B1 | 12/2014 |

* cited by examiner

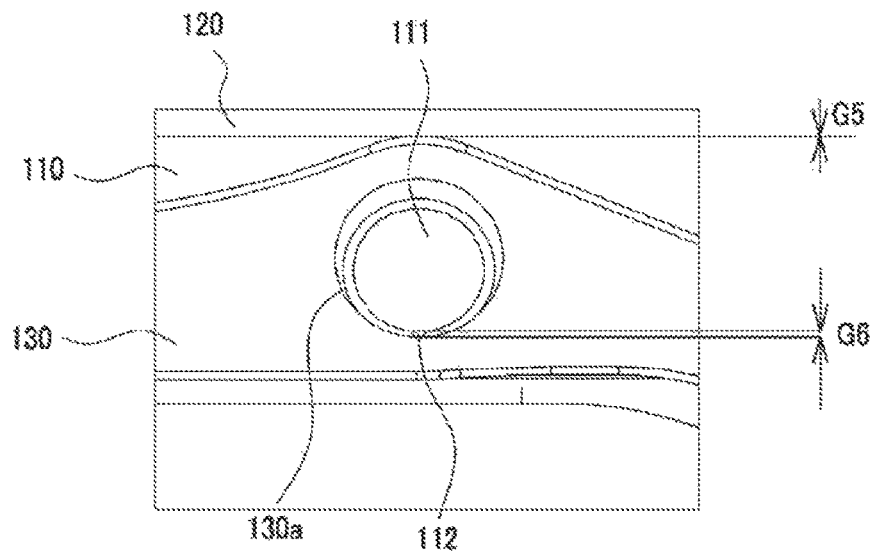
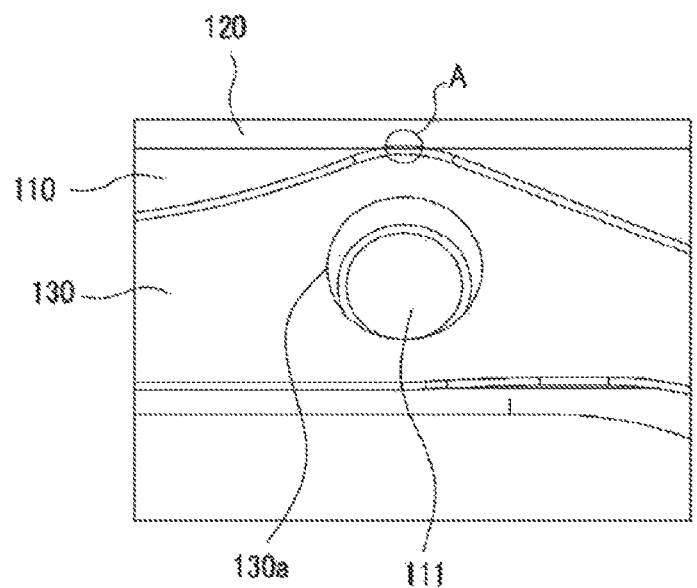
FIG. 13
FIG. 14

ELECTRONIC DEVICE CARD SOCKET

RELATED APPLICATIONS

This application is a national stage of International Application No. PCT/KR2016/006377, filed Jun. 15, 2016, which claims priority to Korean Application No. 10-2015-0084209, filed Jun. 15, 2015, each of which are incorporated herein by reference in their entireties.

TECHNICAL FIELD

The present disclosure relates to a card socket for an electronic device, and more particularly, to a card socket for an electronic device, which can prevent rattle (noise) caused by a movement between respective components in a tray type card socket, and can prevent breakage of a hinge.

BACKGROUND ART

In general, a tray type card socket includes a socket housing into which a tray having a card mounted therein is inserted, a socket cover for covering an upper portion of the socket housing, an ejecting hinge portion which is coupled to a rear end of an inside of the socket housing to be rotatable by a hinge, and pushes a rear end of the tray forward when it is rotated, and an ejecting bar which is installed in the socket housing to be slidable in the forward and backward directions and is connected to the ejecting hinge portion, and rotates the ejecting hinge portion when moving forward and backward by being pushed or pulled by a user.

Such components are assembled to be movable without being fixed in order to implement a mechanism in the card socket. To this end, there is a possibility that undesired rattle (noise) is generated in the card socket having various component assembled therein, due to a collision between respective components caused by a vibration and shaking.

In particular, there is a problem that rattle (noise) is generated due to a collision caused by a movement between components of an ejecting structure, that is, the ejecting hinge portion and the ejecting bar, from among the various components assembled in the card socket.

In addition, in the card socket having the hinge structure, a housing hinge shaft may be installed at the rear end of the inside of the socket housing so as to rotatably support the ejecting hinge portion, but, since strong force is exerted to the hinge shaft when the ejecting hinge portion is rotated by pressure of the ejecting bar, there is a problem that the hinge shaft of the ejecting hinge portion is broken.

Patent Document 1: Korean Patent Laid-Open Publication No. 10-2008-0061256

Patent Document 2: Korean Patent Laid-Open Publication No. 10-2014-0024167

SUMMARY

One technical object to be solved by the present disclosure is to provide a card socket for an electronic device, which can prevent rattle (noise) which may be caused by a collision between respective components when a vibration is generated in a tray type card socket, which uses various components assembled in a card socket, in particular, an ejecting hinge portion and an ejecting bar.

Another technical object to be solved by the present disclosure is to provide a card socket for an electronic device, which can prevent breakage of a hinge shaft of an ejecting hinge portion that has a hinge structure from among various components assembled in a card socket.

To achieve the above-described technical objects, a card socket for an electronic device according to one embodiment of the present disclosure may include: a socket housing which has a space into which a tray having a card mounted therein is inserted; a socket cover which is installed on an upper portion of the socket housing; an ejecting hinge portion which is rotatably coupled to one side of the socket housing by a hinge, and pushes the tray forward and remove the tray when being rotated; an ejecting bar which is installed at the other side of the socket housing to be movable in forward and backward directions, and is connected to the ejecting hinge portion and rotates the ejecting hinge portion when moving forward and backward; and a movement preventing means which prevents a movement of at least one of the ejecting hinge portion and the ejecting bar when a vibration is generated between components of the card socket.

In addition, the movement preventing means may include an ejecting hinge movement preventing portion which variably presses the ejecting hinge portion according to a rotation position of the ejecting hinge portion when the tray is inserted, thereby preventing a movement of the ejecting hinge portion.

In addition, the ejecting hinge movement preventing portion may include an ejecting hinge movement preventing stepped portion which is formed on a lower surface of an inside of the socket housing in a step shape along a rotation direction of the ejecting hinge portion, and, when the tray is inserted, the ejecting hinge portion is variably pressed toward the socket cover due to a corresponding difference in a step height of the ejecting hinge movement preventing stepped portion according to a rotation position of the ejecting hinge portion, such that a movement of the ejecting hinge portion is prevented.

In addition, the ejecting hinge movement preventing stepped portion may include a stepped protrusion which is formed at one side of the lower surface of the inside of the socket housing to be stepped higher than the lower surface of the socket housing so as to correspond to a rotation position of one end of a rotation side of the ejecting hinge portion when the tray is inserted. Before the tray is inserted, the one end of the rotation side of the ejecting hinge portion may be positioned on the lower surface of the inside of the socket housing, and a gap may exist between the socket cover and the ejecting hinge portion. After the tray is inserted, the one end of the rotation side of the ejecting hinge portion may be rotated to the stepped protrusion and positioned on the stepped protrusion, such that an overlap occurs between the socket cover and the ejecting hinge portion. After the tray is inserted, a relatively greater pressure of the socket cover may be exerted to the ejecting hinge portion than before the tray is inserted, such that a movement of the ejecting hinge portion is prevented.

In addition, the ejecting hinge movement preventing portion may further include a pair of hinge movement preventing recess portions which are spaced from each other and formed on the socket cover so as to correspond to a rotation position of the other end of the rotation side of the ejecting hinge portion, and a movement preventing protrusion protruding upward from the other end of the rotation side of the ejecting hinge portion may be selectively inserted into and fixed to the pair of hinge movement preventing recess portions according to a rotation position of the ejecting hinge portion before or after the tray is inserted, such that a movement of the ejecting hinge portion is prevented.

In addition, the movement preventing means may further include an ejecting bar movement preventing portion which variably presses the ejecting bar according to a rotation position of the ejecting bar when the tray is inserted, thereby preventing a movement of the ejecting bar.

In addition, the ejecting bar movement preventing portion may include: an ejecting bar movement preventing stepped portion which is formed on an upper surface of the ejecting bar in a step shape in a lengthwise direction; and a plate spring portion which is integrally formed with the socket cover and is in contact with the ejecting bar movement preventing stepped portion, and variably and elastically presses the ejecting bar due to a corresponding difference in a step height of the ejecting bar movement preventing stepped portion according to a movement position of the ejecting bar.

In addition, the ejecting bar movement preventing stepped portion may include: a first stepped recess portion which is formed at one side of the upper surface of the ejecting bar; and a second stepped recess portion which is formed at the other side of the upper surface of the ejecting bar and is continuously connected with the first stepped recess portion, and has a step height higher than that of the first stepped recess portion, and, before the tray is inserted, the plate spring portion is in contact with the first stepped recess portion and an overlap is formed between the plate spring portion and the ejecting bar, and, after the tray is inserted, the plate spring portion is brought into contact with the second stepped recess portion and an overlap is formed between the plate spring portion and the ejecting bar, and a larger overlap is formed between the plate spring portion and the ejecting bar after the tray is inserted than before the tray is inserted, such that a relatively great pressure of the plate spring portion is exerted to the ejecting bar and a movement of the ejecting bar is prevented.

In addition, the card socket for the electronic device of the present disclosure may include a hinge breakage preventing means which prevents breakage of a hinge shaft of the ejecting hinge portion which is caused by mutual collision interference between the socket cover and the ejecting hinge portion when the socket cover is assembled.

In addition, the hinge breakage preventing means may include a hinge breakage preventing protrusion which protrudes from one side surface of the hinge shaft facing an insertion direction of the tray, and, when the socket cover is assembled, the hinge breakage preventing protrusion may correct a position of the ejecting hinge portion so as to make a gap between the socket cover and the ejecting hinge portion, and thus not to cause mutual collision interference between the socket cover and the ejecting hinge portion, such that breakage of the hinge shaft of the ejecting hinge portion is prevented.

The card socket for the electronic device of the present disclosure has the following effects.

Firstly, the present disclosure can prevent rattle (noise) which may be caused by a collision between respective components when a vibration is generated in the tray type card socket, which uses various components assembled in the card socket, in particular, the ejecting hinge portion and the ejecting bar.

Secondly, the present disclosure has the ejecting hinge movement preventing stepped portion formed on the lower surface of the inside of the socket housing in the step shape along the rotation direction of the ejecting hinge portion, such that the ejecting hinge portion is variably pressed toward the socket cover due to a corresponding difference in the step height of the stepped portion according to a rotation position of the ejecting hinge portion when the tray is inserted, and can prevent the movement of the ejecting hinge portion.

Thirdly, the present disclosure has the ejecting bar movement preventing stepped portion formed on the upper surface of the ejecting bar in the step shape in the lengthwise direction, such that the plate spring portion formed on the socket cover variably and elastically presses the ejecting bar due to a corresponding difference in the step height of the stepped portion according to a movement position of the ejecting bar when the tray is inserted, and can prevent the movement of the ejecting bar.

Fourthly, the present disclosure can minimize thermal deformation of the socket including injection molded materials by preventing force from being exerted to respective components of the socket when the socket is assembled and soldering mounted.

Fifthly, the present disclosure has the hinge breakage preventing protrusion formed on the hinge shaft of the socket housing to which the ejecting hinge portion is rotatably coupled, such that breakage of the hinge shaft which may be caused by mutual collision interference between the socket cover and the ejecting hinge portion can be prevented when the socket cover is assembled, and the socket can be normally assembled without a collision between the socket cover and the ejecting hinge portion.

BRIEF DESCRIPTION OF THE DRAWINGS

FIGS. 12 and 13 are views showing a change in a position of the ejecting hinge portion on the hinge shaft before and after the tray is inserted, respectively;

FIGS. 14 and 15 are views showing a difference in collision interference between a socket cover and the ejecting hinge portion according to presence/absence of the hinge breakage preventing protrusion for preventing breakage of the hinge when the socket is assembled.

DETAILED DESCRIPTION OF THE PREFERRED EMBODIMENTS

Hereinafter, a card socket for an electronic device according to preferred embodiments of the present disclosure will be described in detail with reference to the accompanying drawings. For reference, in the following description, detailed descriptions of well-known functions or configurations will be omitted since they would unnecessarily obscure the subject matters of the present disclosure.

Figure 1:
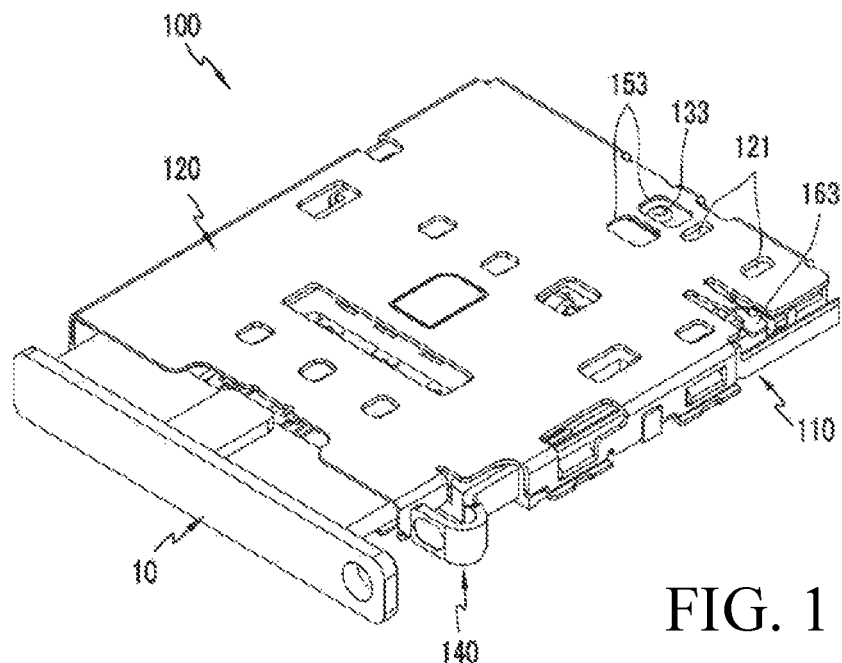
FIG. 1 is a perspective view of a card socket for an electronic device according to one embodiment of the present disclosure.

FIG. 1 is a perspective view of a card socket for an electronic device according to one embodiment of the present disclosure.

As shown in FIG. 1, a card socket 100 for an electronic device according to one embodiment of the present disclosure may include a socket housing 110, a socket cover 120, an ejecting hinge portion 130 (see FIG. 2), an ejecting bar 140, a movement preventing means, and a hinge breakage preventing means.

The socket housing 110 has an insertion space opened to a front portion through which a tray 10 having a card (not shown) mounted therein is inserted, and to an upper portion which is covered by the socket cover 120, which will be described below. A bottom surface of the insertion space is provided with a contact terminal (not shown) which is brought into contact with the card, and a rear side of the insertion space is provided with a detect terminal (not shown), as a card insertion check terminal for detecting insertion of a card/tray when the card/tray is inserted, and a switch terminal (not shown).

The socket cover 120 is coupled to an upper portion of the socket housing 110 to cover the insertion space. The socket cover 120 may be formed of a metal shell formed of metal. The socket cover 120 has a recess formed on an upper surface thereof by pressing one side portion of the socket cover 120 corresponding to a portion at which the ejecting hinge portion 130 is positioned, such that a movement preventing bead 121 is formed on a lower surface of the socket cover 120 opposite to the recess to protrude downward so as to face the ejecting hinge portion 130 and to press an upper surface of the ejecting hinge portion 130 and fixedly support the same so as not to cause a movement. In addition, the socket cover 120 may include a hinge movement preventing recess portion 153 for preventing a movement of the ejecting hinge portion 130, and a plate spring portion 163 for preventing a movement of the ejecting bar 140. The hinge movement preventing recess portion 153 and the plate spring portion 163 described above will be described in detail below with reference to FIG. 2.

The ejecting hinge portion 130 is rotatably coupled to one side of the socket housing 110, specifically, to a hinge shaft 111 formed at a rear end of an inside of the socket housing 110, and serves to push the rear end of the tray 10 forward and to remove the tray 10 when the ejecting hinge portion 130 is rotated.

The ejecting bar 140 is installed on the other side of the socket housing 110, specifically, on a side surface portion of the inside of the socket housing 110 to be slidable in forward and backward directions, and is connected to the ejecting hinge portion 130, and the ejecting bar 140 serves to rotate the ejecting hinge portion 130 when the ejecting bar 140 moves forward and backward by being pushed or pulled by a user.

The movement preventing means serves to prevent rattle (noise) which may be caused by a collision between various components assembled in the card socket 100 when a vibration is generated. In particular, the movement preventing means prevents movements of the ejecting hinge portion 130 and the ejecting bar 140 when a vibration is generated between components in the tray type card socket 100.

The hinge shaft 111 rotatably supporting the ejecting hinge portion 130, which has a hinge structure from among various components assembled in the card socket 100, is vulnerable to strong force or repeated use. The hinge breakage preventing means serves to reduce the force exerted to such hinge shaft 111 and to prevent the hinge shaft 111 from being broken.

Figure 2:
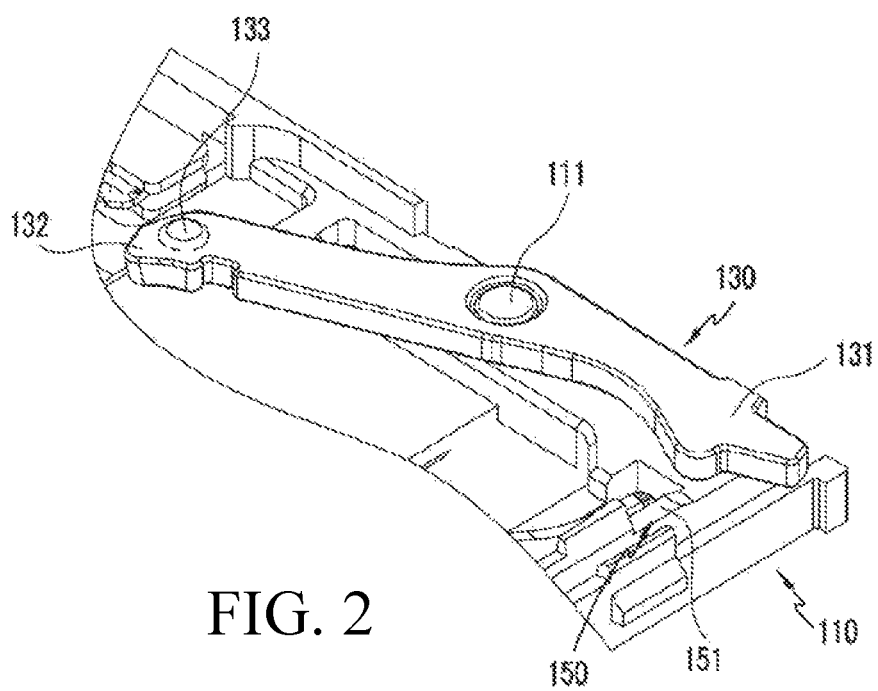
FIG. 2 is an enlarged view partially showing a card socket having an ejecting hinge movement preventing portion (a stepped portion of a step shape) formed on a lower surface of an inside of a socket housing.
Figure 3:
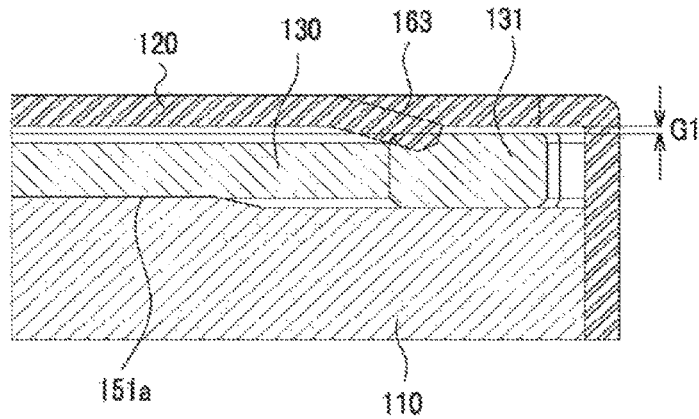
FIGS. 3 and 4 are cross-sectional views showing a state in which an ejecting hinge portion is variably pressed by the stepped portion formed on the lower surface of the inside of the socket housing according to a rotation position of the ejecting hinge portion when a tray is inserted, such that a movement of the ejecting hinge portion is prevented.
Figure 4:
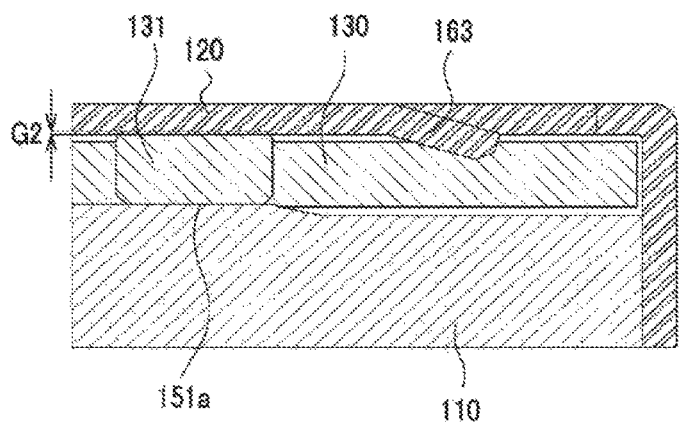
Figure 5:
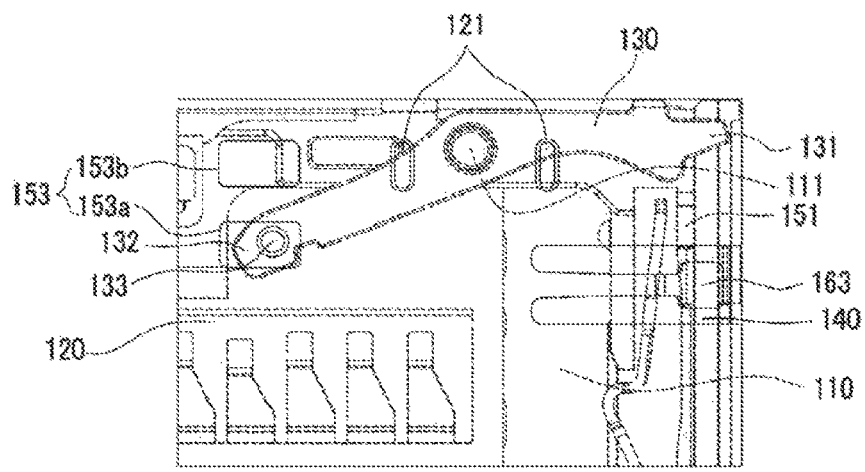
FIGS. 5 and 6 are top views of the card socket showing a movement preventing recess structure according to a rotation position of the ejecting hinge portion before and after the tray is inserted, respectively.
Figure 6:
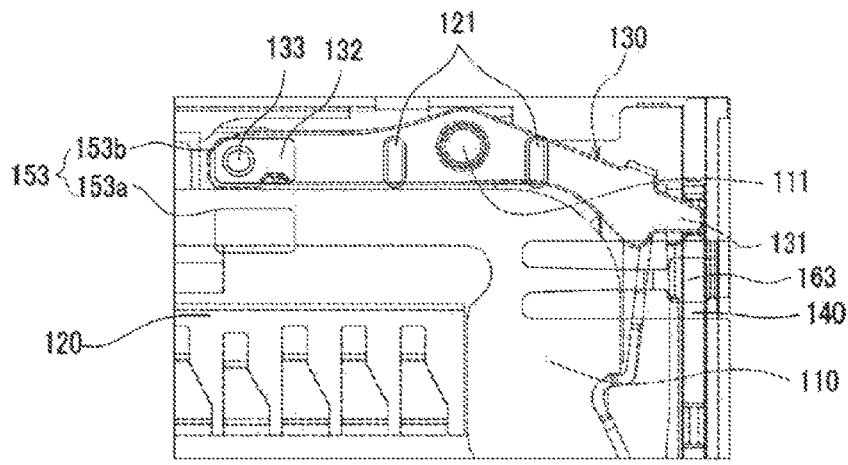

FIG. 2 is an enlarged view partially showing the card socket having an ejecting hinge movement preventing portion (a stepped portion of a step shape) formed on a lower surface of an inside of the socket housing, FIGS. 3 and 4 are cross-sectional views showing a state in which the ejecting hinge portion is variably pressed by the stepped portion formed on the lower surface of the inside of the socket housing according to a rotation position of the ejecting hinge portion when the tray is inserted, such that a movement of the ejecting hinge portion is prevented, and FIGS. 5 and 6 are top views of the card socket showing a movement preventing recess structure according to a rotation position of the ejecting hinge portion before and after the tray is inserted, respectively.

As shown in FIGS. 2 to 6, the movement preventing means may include an ejecting hinge movement preventing portion 150 which variably presses the ejecting hinge portion 130 according to a rotation position of the ejecting hinge portion 130 when the tray 10 is inserted, thereby preventing a movement of the ejecting hinge portion 130.

The ejecting hinge movement preventing portion 150 described above may be configured to include a stepped portion 151 and the hinge movement preventing recess portion 153.

The ejecting hinge movement preventing stepped portion 151 is formed on the lower surface of the inside of the socket housing 110 in a step shape along a rotation direction of the ejecting hinge portion 130, and the ejecting hinge portion 130 is variably pressed toward the socket cover 120 due to a corresponding difference in the step height of the stepped portion 151 according to a rotation position of the ejecting hinge portion 130 when the tray 10 is inserted, such that a movement of the ejecting hinge portion 130 is prevented.

The ejecting hinge movement preventing stepped portion 151 may include a stepped protrusion 151a which is formed at one side of the lower surface of the inside of the socket housing 110 to be stepped higher than the lower surface of the socket housing 110 so as to correspond to a rotation position of one end 131 of a rotation side of the ejecting hinge portion 130 when the tray 10 is inserted.

Accordingly, as shown in FIG. 3, before the tray 10 is inserted, one end 131 of the rotation side of the ejecting hinge portion 130 is positioned on the lower surface of the inside of the socket housing 110 and a gap G1 exists between the socket cover 120 and the ejecting hinge portion 130, such that pressure of the socket cover 120 is less exerted to the ejecting hinge portion 130. In addition, as shown in FIG. 4, after the tray 10 is inserted, one end 131 of the rotation side of the ejecting hinge portion 130 is rotated to the stepped protrusion 151a and is positioned on the stepped protrusion 151a, such that an overlap G2 is generated between the socket cover 120 and the ejecting hinge portion 130, and relatively great pressure of the socket cover 120 is exerted to the ejecting hinge portion 130.

Accordingly, before the assembled socket is soldering mounted, thermal deformation of the socket is prevented by minimizing the force exerted to the ejecting hinge portion 130, and, when the tray 10 is inserted and used by the user after the socket is soldering mounted, additional force is exerted to the ejecting hinge portion 130 and prevents a movement of the ejecting hinge portion 130.

A pair of hinge movement preventing recess portions 153 are formed on the socket cover 120, spaced from each other, so as to correspond to a rotation position of the other end 132 of the rotation side of the ejecting hinge portion 130, and, before and after the tray 10 is inserted, a movement preventing protrusion 133 protruding upward from the other end 132 of the rotation side of the ejecting hinge portion 130 is selectively inserted into and fixed to the pair of hinge movement preventing recess portions 153 according to a rotation position of the ejecting hinge portion 130, such that a movement of the ejecting hinge portion 130 can be prevented. For example, as shown in FIG. 5, before the tray 10 is inserted, the movement preventing protrusion 133 formed at the other end 132 of the rotation side of the ejecting hinge portion 130 is inserted into and locked by a first hinge movement preventing recess 153a, and, as shown in FIG. 6, after the tray 10 is inserted, the ejecting hinge portion 130 is rotated in a clockwise direction, and the movement preventing protrusion 133 formed at the other end 132 of the rotation side of the ejecting hinge portion 130 is inserted into and locked by a second hinge movement preventing recess 153b, such that a movement of the other end 132 of the rotation side of the ejecting hinge portion 130 can be prevented when a vibration is generated between components.

Figure 7:
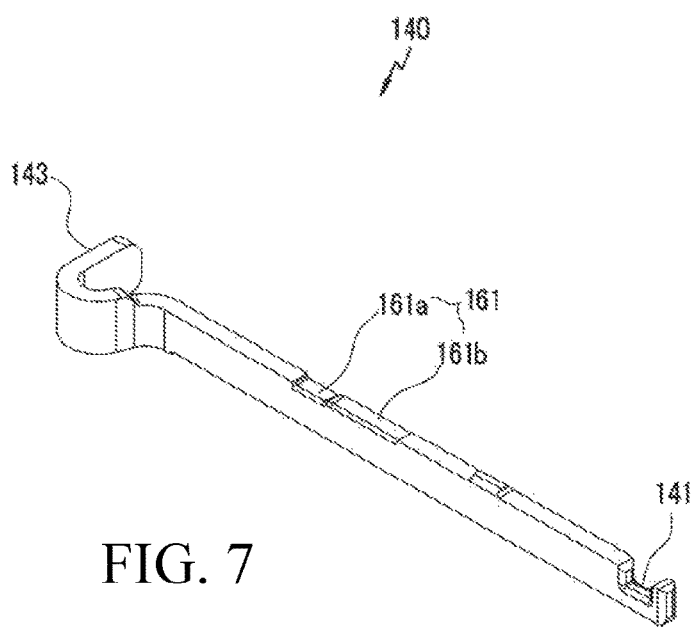
FIG. 7 is a perspective view of an ejecting bar having an ejecting bar movement preventing portion (a stepped portion of a step shape) formed on an upper surface of the ejecting bar.
Figure 8:
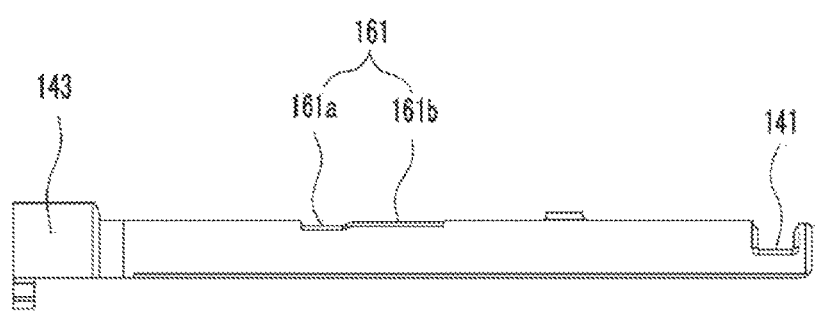
FIG. 8 is a front view of FIG. 7.
Figure 9:
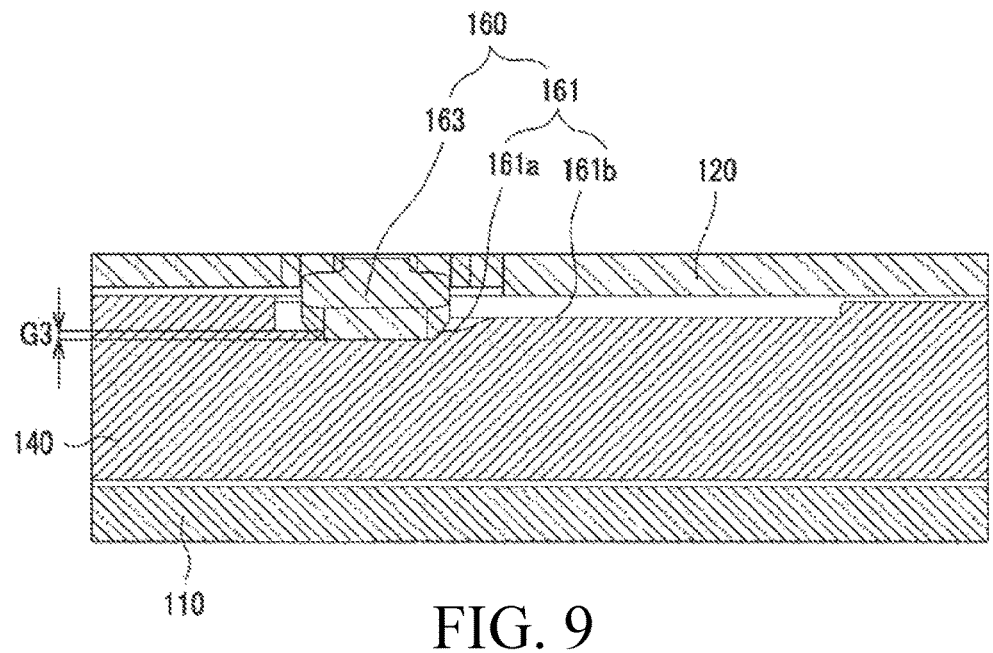
FIGS. 9 and 10 are cross-sectional views showing a state in which a plate spring portion variably and elastically presses the ejecting bar due to the stepped portion formed on the upper surface of the ejecting bar according to a movement position of the ejecting bar when the tray is inserted, such that a movement of the ejecting hinge portion is prevented.
Figure 10:
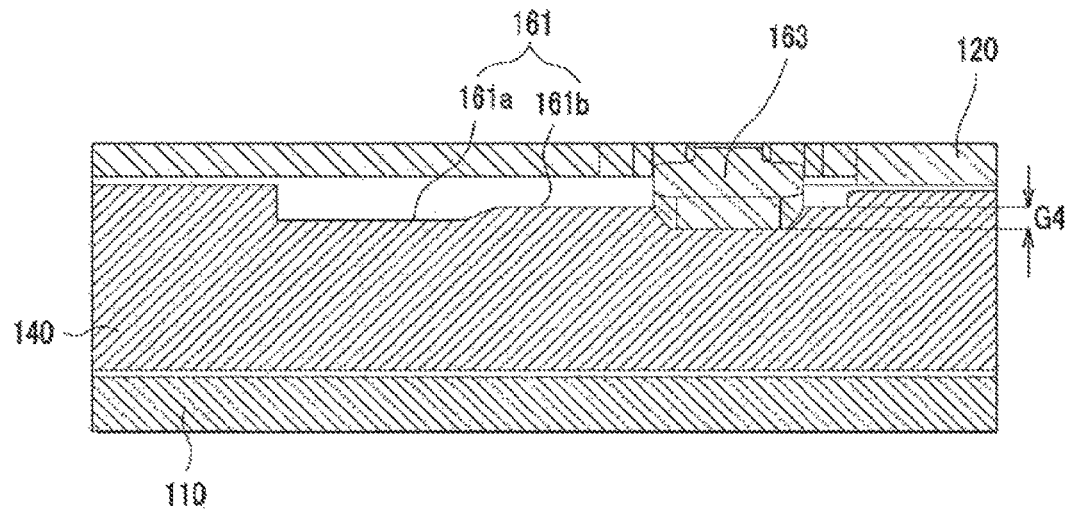

FIG. 7 is a perspective view of the ejecting bar having an ejecting bar movement preventing portion (a stepped portion of a step shape) formed on an upper surface of the ejecting bar. FIG. 8 is a front view of FIG. 7. FIGS. 9 and 10 are cross-sectional views showing a state in which the plate spring portion variably and elastically presses the ejecting bar due to the stepped portion formed on the upper surface of the ejecting bar according to a movement position of the ejecting bar when the tray is inserted, such that a movement of the ejecting hinge portion is prevented.

As shown in FIGS. 7 to 10, the movement preventing means may include an ejecting bar movement preventing portion 160 which variably presses the ejecting bar 140 according to a movement position of the ejecting bar 140 when the tray 10 is inserted, thereby preventing a movement of the ejecting bar 140.

The ejecting bar movement preventing portion 160 may include a stepped portion 161 and the plate spring portion 163.

The ejecting bar movement preventing stepped portion 161 is formed on the upper surface of the ejecting bar 140 in a step shape in a lengthwise direction. The ejecting bar 140 is installed in the socket housing 110 to be movable in forward and backward directions, and serves to rotate the ejecting hinge portion 130. The ejecting bar 140 is formed in a rectangular bar shape, a connection recess 141 is formed at a front end of the ejecting bar 140 to be connected to the ejecting hinge portion 130, and a push portion 143 bent in a substantially U shape is formed at a rear end of the ejecting bar 140.

The ejecting bar movement preventing stepped portion 161 may include a first stepped recess portion 161a formed on one side of the upper surface of the ejecting bar 140, for example, formed on a predetermined section from a substantially center portion of the upper surface of the ejecting bar 140 to the side of the push portion 143, and a second stepped recess portion 161b formed on the other side of the upper surface of the ejecting bar 140, for example, continuously connected with the first stepped recess portion 161a on the substantially center portion of the upper surface and having a step height higher than that of the first stepped recess portion 161a. It is preferable that a length of the first stepped recess portion 161a is identical to or slightly larger than a width of an end of the plate spring portion 163, and a depth of the first stepped recess portion 161a is even smaller than a thickness of the end of the plate spring portion 163. In addition, it is preferable that a length of the second stepped recess portion 161b is longer, for example, substantially two times longer than a length of the first stepped recess portion 161a, and a depth of the second stepped recess portion 161b is smaller than the depth of the first stepped recess portion 161a, for example, is substantially half of the depth of the first stepped recess portion 161a.

Accordingly, as shown in FIG. 9, before the tray 10 is inserted, the plate spring portion 163 is in contact with the first stepped recess portion 161a and a small overlap G3 is formed between the plate spring portion 163 and the ejecting bar 140, such that pressure of the plate spring portion 163 is less exerted to the ejecting bar 140. In addition, as shown in FIG. 10, after the tray 10 is inserted, the plate spring portion 163 is brought into contact with the second stepped recess portion 161b and a large overlap G4 is formed between the plate spring portion 163 and the ejecting bar 140, such that relatively great pressure of the plate spring portion 163 is exerted to the ejecting bar 140.

Accordingly, before the assembled socket is soldering mounted, thermal deformation of the socket is prevented by minimizing the force exerted to the ejecting bar 140, and, when the tray 10 is inserted and used by the user after the socket is soldering mounted, additional force is exerted to the ejecting bar 140, and prevents a movement of the ejecting bar 140.

The plate spring portion 163 is integrally formed with the socket cover 120 and is in contact with the stepped portion 161 on the upper surface of the ejecting bar 140, and variably and elastically presses the ejecting bar 140 due to a corresponding difference in the step heights between the first stepped recess portion 161a and the second stepped recess portion 161b of the stepped portion 161 according to a movement position of the ejecting bar 140.

The plate spring portion 163 may be formed in a tension plate shape by cutting one side of a side portion of the socket cover 120 in a U shape and then bending a free end formed between the cut portions downward, such that the plate spring portion 163 elastically presses the stepped portion 161 on the upper surface of the ejecting bar 140. Although an end of the plate spring portion 163 pressing the stepped portion 161 on the upper surface of the ejecting bar 140 is formed in a rectangular plate shape in the present embodiment, this should not be considered as limiting and the end of the plate spring portion 163 may be formed in various shapes such as a circular plate shape, an oval plate shape, or the like.

Figure 11:
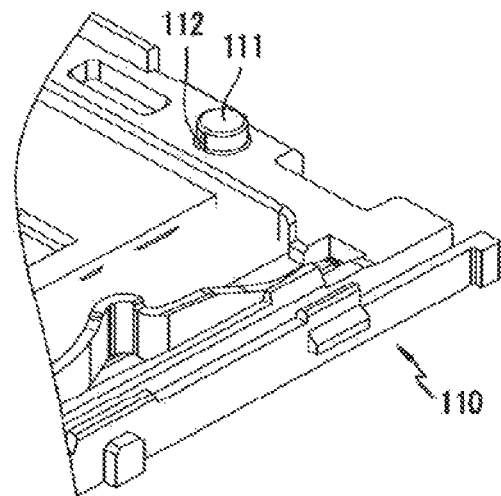
FIG. 11 is an enlarged view partially showing the card socket having a hinge breakage preventing means (a hinge breakage preventing protrusion) formed on the hinge shaft of the ejecting hinge portion.

FIG. 11 is an enlarged view partially showing the card socket having the hinge breakage preventing means (hinge breakage preventing protrusion) formed on the hinge shaft of the ejecting hinge portion.

As shown in FIG. 11, the hinge breakage preventing means prevents breakage of the hinge shaft 111 of the ejecting hinge portion 130 (see FIG. 2) having a hinge structure from among various components assembled in the card socket, and in particular, the hinge breakage preventing means prevents breakage of the hinge shaft 111 of the ejecting hinge portion 130 which is caused by mutual collision interference between the socket cover 120 and the ejecting hinge portion 130 when the socket cover 120 is assembled.

The hinge breakage preventing means described above may include a hinge breakage preventing protrusion 112 which is formed on the hinge shaft 111 formed on a rear end of the insertion space of the inside of the socket housing 110 to rotatably support the ejecting hinge portion 130, and protrudes from one side surface of the hinge shaft 111 facing the insertion direction of the tray 10. Accordingly, when the socket cover 120 is assembled, the hinge breakage preventing protrusion 112 corrects the position of the ejecting hinge portion 130 so as to make a gap between the socket cover 120 and the ejecting hinge portion 130, and thus not to cause mutual collision interference between the socket cover 120 and the ejecting hinge portion 130, such that breakage of the hinge shaft 111 of the ejecting hinge portion 130 can be prevented.

Figure 12:
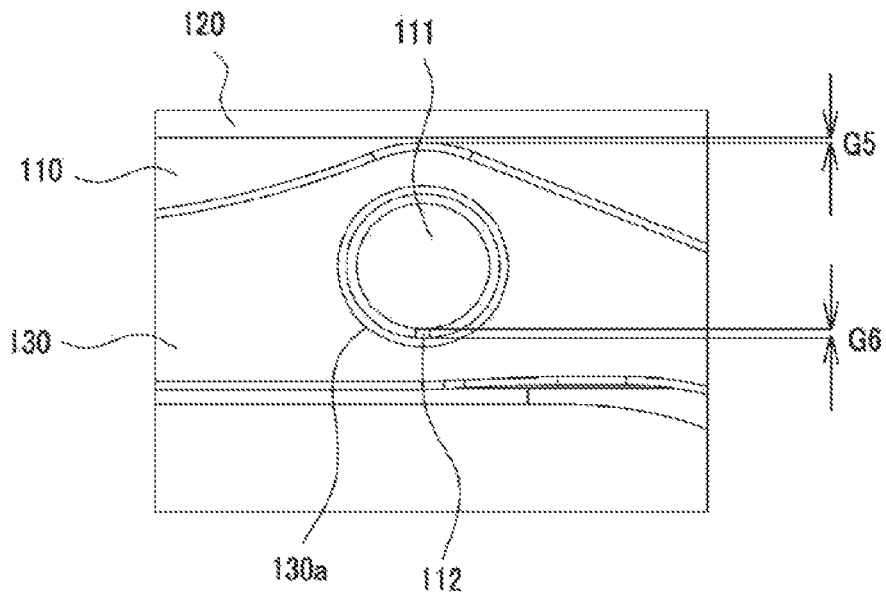

FIGS. 12 and 13 are views showing a change in the position of the ejecting hinge portion with respect to the hinge shaft before and after the tray is inserted, respectively.

As shown in FIG. 12, when the ejecting hinge portion 130 is positioned before the tray 10 is inserted, a gap G5 between the socket cover 120 and the ejecting hinge portion 130 is equal to or smaller than a gap G6 between the hinge shaft 111 and a hinge hole 130a due to the hinge breakage preventing protrusion 112 formed on the hinge shaft 111 of the ejecting hinge portion 130, such that a stress generated on the hinge shaft 111 can be minimized.

As shown in FIG. 13, when the ejecting hinge portion 130 is positioned after the tray 10 is inserted or a product is conveyed or assembled, the position of the ejecting hinge portion 130 is changed due to a vibration and the gap G5 between the socket cover 120 and the ejecting hinge portion 130 disappears, and a small gap G6 exists between the hinge shaft 111 and the hinge hole 130a. At this time, the hinge breakage preventing protrusion 112 formed on the hinge shaft 111 of the ejecting hinge portion 130 endures up to predetermined force and thus can prevent breakage of the ejecting hinge portion 130.

Figure 15:
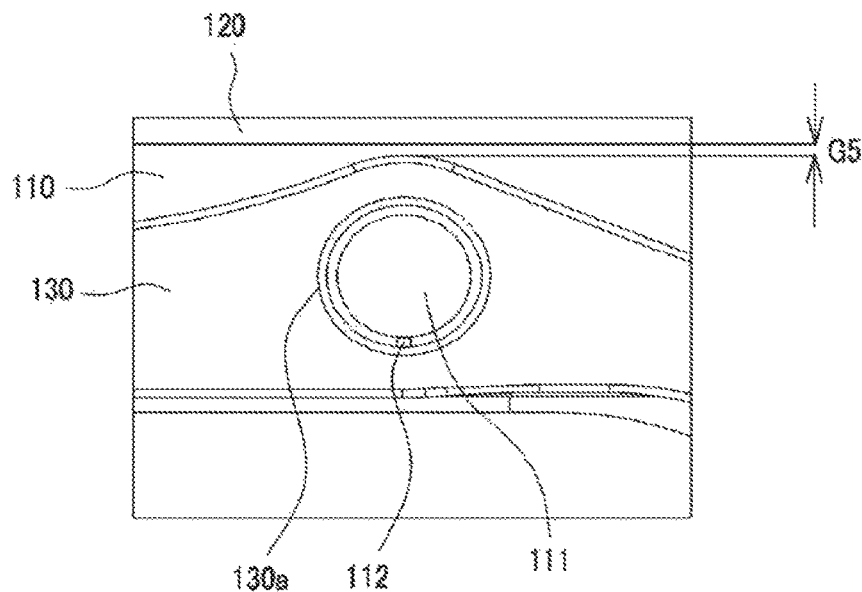

FIGS. 14 and 15 are views showing a difference in collision interference between the socket cover and the ejecting hinge portion according to presence/absence of the hinge breakage preventing protrusion for preventing breakage of the hinge when the socket is assembled.

As shown in FIG. 14, when the hinge breakage preventing protrusion 112 does not exist on the hinge shaft 111, an overlap A exists between the socket cover 120 and the ejecting hinge portion 130, and thus, when the socket cover 120 is assembled, mutual collision interference occurs between the socket cover 120 and the ejecting hinge portion 130 and there are problems that the hinge is released or a defect in socket assembly occurs.

As shown in FIG. 15, when the hinge breakage preventing protrusion 112 is formed on the hinge shaft 111, the hinge breakage preventing protrusion 112 corrects the position of the ejecting hinge portion 130 so as to make a gap between the socket cover 120 and the ejecting hinge portion 130 during the assembly of the socket cover 120, and thus not to cause mutual collision interference between the socket cover 120 and the ejecting hinge portion 130, such that the socket can be normally assembled and breakage of the hinge shaft 111 of the ejecting hinge portion 130 can be prevented.

Figure 16:
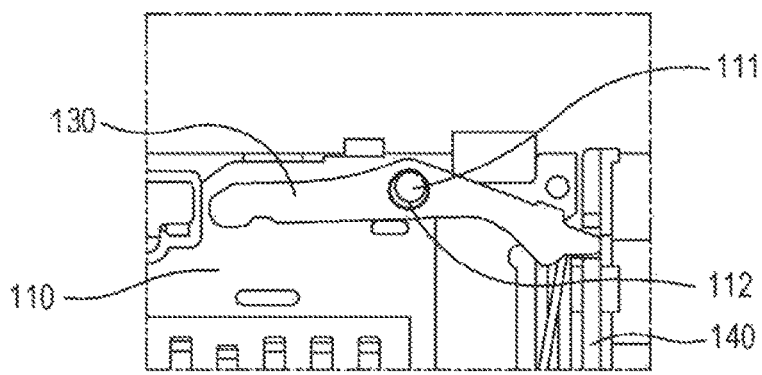
FIGS. 16 to 18 are views showing results of an experiment of hinge strength of the ejecting hinge portion when the hinge breakage preventing protrusion for preventing breakage of the hinge is formed on the hinge shaft of the ejecting hinge portion.
Figure 17:
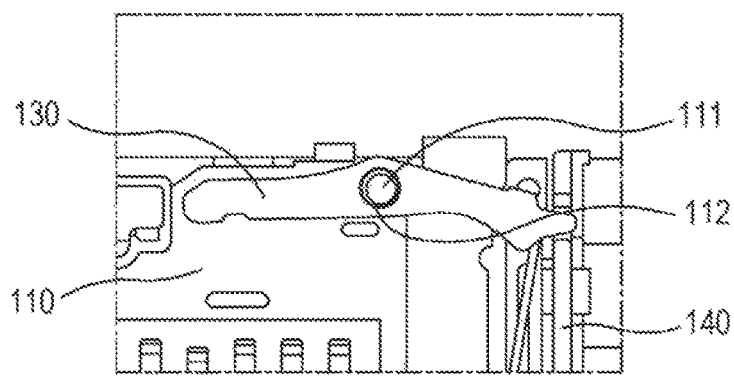
Figure 18:
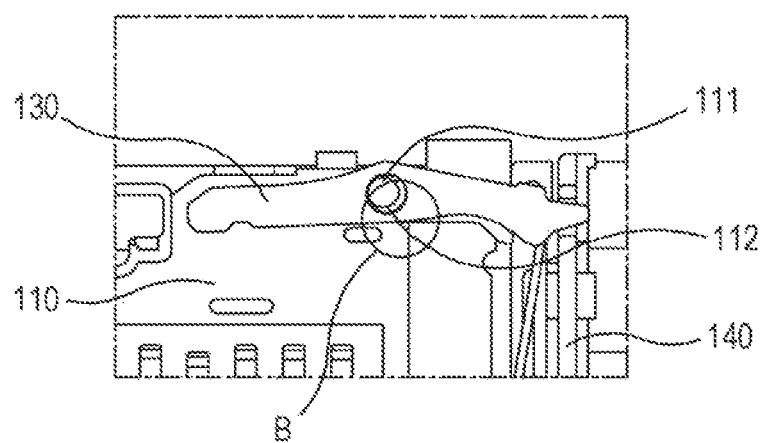

FIGS. 16 to 18 are views respectively showing results of an experiment on hinge strength of the ejecting hinge portion when the hinge breakage preventing protrusion for preventing breakage of the hinge is formed on the hinge shaft of the ejecting hinge portion.

The experimenting method was to fix the tray 10 not to protrude even when the ejecting bar 140 is strongly pressed, and to check a degree of hinge destruction of the ejecting hinge portion 130 while increasing the intensity of press of the ejecting bar 140.

FIGS. 16, 17, and 18 are experiment views respectively showing hinge destruction states of the ejecting hinge portion 130 when the intensity of the press of the ejecting bar 140 is an initial value, 10 Kgf, and 12 Kgf or more.

In addition, table 1 presented below shows the results of the experiment showing breakage states of the ejecting hinge portion 130 and the hinge shaft 111 when the intensity of the press of the ejecting bar 140 with respect to five specimens increases.

TABLE 1

| Classification | Specimen 1 | Specimen 2 | Specimen 3 | Specimen 4 | Specimen 5 |
| --- | --- | --- | --- | --- | --- |
| Intensity of press (Kgf) | 9.8 | 12.5 | 12.9 | 13.1 | 14.0 |
| Ejecting hinge portion | Not broken | Broken | Broken | Broken | Broken |
| Housing hinge shaft | Not broken | Not broken | Not broken | Not broken | Not broken |

As shown in the results of the experiment of FIGS. 16 and 17 and specimen 1 of table 1, when the intensity of the pressure of the ejecting bar 140 was less than or equal to 10 Kgf, neither of the ejecting hinge portion 130 and the hinge shaft 111 was broken.

As shown in the result of the experiment of FIG. 18 and specimens 2 to 5 of table 1, when the intensity of the pressure of the ejecting bar 140 was greater than or equal to 12 Kgf, breakage B (tension/notch) occurred on the ejecting hinge portion 130, but the housing hinge shaft 111 was not broken. This is because, when the intensity of pressure of the ejecting bar 140 is exerted to the ejecting hinge portion 130, force is less exerted to the hinge shaft 111 due to the hinge breakage preventing protrusion 112, and breakage of the hinge shaft 111 can be prevented.

The card socket 100 for an electronic device configured as described above according to one embodiment of the present disclosure can prevent rattle (noise) which may be caused by a collision between respective components when a vibration is generated in the tray type card socket, which uses various components assembled in the card socket, in particular, the ejecting hinge portion 130 and the ejecting bar 140. In addition, the ejecting hinge movement preventing stepped portion 151 is formed on the lower surface of the inside of the socket housing 110 in the step shape along the rotation direction of the ejecting hinge portion 130, such that the ejecting hinge portion 130 is variably pressed toward the socket cover 120 due to a corresponding difference in the step height of the stepped portion 151 according to a rotation position of the ejecting hinge portion 130 when the tray 10 is inserted, and the movement of the ejecting hinge portion 130 can be prevented. In addition, the ejecting bar movement preventing stepped portion 161 is formed on the upper surface of the ejecting bar 140 in the step shape in the lengthwise direction, such that the plate spring portion 163 formed on the socket cover 120 variably and elastically presses the ejecting bar 140 due to a corresponding difference in the step height of the stepped portion 161 according to a movement position of the ejecting bar 140 when the tray 10 is inserted, and can prevent the movement of the ejecting bar 140. In addition, thermal deformation of the socket including injection molded materials can be minimized by preventing force from being exerted to respective components of the socket when the socket is assembled and soldering mounted. In addition, the hinge breakage preventing protrusion 112 is formed on the hinge shaft 111 of the socket housing 110 to which the ejecting hinge portion 130 is rotatably coupled, such that breakage of the hinge shaft 111 which may be caused by mutual collision interference between the socket cover 120 and the ejecting hinge portion 130 can be prevented when the socket cover 120 is assembled, and the socket can be normally assembled without a collision between the socket cover 120 and the ejecting hinge portion 130.

Exemplary embodiments of the present disclosure have been explained hereinabove with reference to the drawings attached, but it should be understood that the present disclosure may be implemented by a person skilled in the art in other specific forms without altering the technical concept or essential characteristics of the present disclosure. Accordingly, it should be understood that the exemplary embodiments described above are only illustrative in view of all aspects, and should not be construed as limiting. The scope of the present disclosure is based on the claims described below rather than the detailed description, and the meaning and the scope of the claims and all change or changed forms derived from the equivalents thereof should be interpreted as being included in the scope of the present disclosure.

What is claimed is:

1. A card socket for an electronic device, the card socket comprising:
   a socket housing which has a space, the socket housing being configured to have a tray inserted into the space, the tray being configured to have a card mounted therein;
   a socket cover which is installed on an upper portion of the socket housing;
   an ejecting hinge portion which is rotatably coupled to a first side of the socket housing by a hinge, wherein when the ejecting hinge portion is rotated in a first direction, the ejecting hinge portion is configured to push the tray in a forward direction to allow for removal of the tray from the space;
   an ejecting bar which is installed on a second side of the socket housing, the ejecting bar being configured to be movable in forward and backward directions, the ejecting bar being connected to the ejecting hinge portion, wherein, upon movement of the ejecting bar in the forward direction, the ejecting bar causes the ejecting hinge portion to rotate in a second direction, and wherein, upon movement of the ejecting bar in the backward direction, the ejecting bar causes the ejecting hinge portion to rotate in the first direction; and
   an ejecting hinge movement preventing portion which variably presses the ejecting hinge portion according to a rotation position of the ejecting hinge portion when the tray is inserted, thereby preventing a movement of the ejecting hinge portion when a vibration is generated between components of the card socket, wherein the ejecting hinge movement preventing portion comprises an ejecting hinge movement preventing stepped portion which is formed on a lower surface of an inside of the socket housing in a step shape along a rotation direction of the ejecting hinge portion, and wherein, when the tray is inserted, the ejecting hinge portion is variably pressed toward the socket cover due to a corresponding difference in a step height of the ejecting hinge movement preventing stepped portion according to a rotation position of the ejecting hinge portion, such that a movement of the ejecting hinge portion is prevented.

2. The card socket of claim 1, wherein the ejecting hinge movement preventing stepped portion comprises a stepped protrusion which is formed at one side of the lower surface of the inside of the socket housing to be stepped higher than the lower surface of the socket housing so as to correspond to a rotation position of one end of a rotation side of the ejecting hinge portion when the tray is inserted, wherein, before the tray is inserted, the one end of the rotation side of the ejecting hinge portion is positioned on the lower surface of the inside of the socket housing, and a gap exists between the socket cover and the ejecting hinge portion, wherein, after the tray is inserted, the one end of the rotation side of the ejecting hinge portion is rotated to the stepped protrusion and positioned on the stepped protrusion, such that an overlap occurs between the socket cover and the ejecting hinge portion, and wherein, after the tray is inserted, a relatively greater pressure of the socket cover is exerted to the ejecting hinge portion than before the tray is inserted, such that a movement of the ejecting hinge portion is prevented.

3. The card socket of claim 2, wherein the ejecting hinge movement preventing portion further comprises a pair of hinge movement preventing recess portions which are spaced from each other and formed on the socket cover so as to correspond to a rotation position of the other end of the rotation side of the ejecting hinge portion, and wherein a movement preventing protrusion protruding upward from the other end of the rotation side of the ejecting hinge portion is selectively inserted into and fixed to the pair of hinge movement preventing recess portions according to a rotation position of the ejecting hinge portion before or after the tray is inserted, such that a movement of the ejecting hinge portion is prevented.

4. A card socket for an electronic device, the card socket comprising:
   a socket housing which has a space, the socket housing being configured to have a tray inserted into the space, the tray being configured to have a card mounted therein;

a socket cover which is installed on an upper portion of the socket housing;

an ejecting hinge portion which is rotatably coupled to a first side of the socket housing by a hinge, wherein when the ejecting hinge portion is rotated in a first direction, the ejecting hinge portion is configured to push the tray in a forward direction to allow for removal of the tray from the space;

an ejecting bar which is installed on a second side of the socket housing, the ejecting bar being configured to be movable in forward and backward directions, the ejecting bar being connected to the ejecting hinge portion, wherein, upon movement of the ejecting bar in the forward direction, the ejecting bar causes the ejecting hinge portion to rotate in a second direction, and wherein, upon movement of the ejecting bar in the backward direction, the ejecting bar causes the ejecting hinge portion to rotate in the first direction; and an ejecting bar movement preventing portion which variably presses the ejecting bar according to a rotation position of the ejecting bar when the tray is inserted, thereby preventing a movement of the ejecting bar when a vibration is generated between components of the card socket, wherein the ejecting bar movement preventing portion comprises:

an ejecting bar movement preventing stepped portion which is formed on an upper surface of the ejecting bar in a step shape in a lengthwise direction; and a plate spring portion which is integrally formed with the socket cover and is in contact with the ejecting bar movement preventing stepped portion, and variably and elastically presses the ejecting bar due to a corresponding difference in a step height of the ejecting bar movement preventing stepped portion according to a movement position of the ejecting bar.

5. The card socket of claim 4, wherein the ejecting bar movement preventing stepped portion comprises:

a first stepped recess portion which is formed at one side of the upper surface of the ejecting bar; and a second stepped recess portion which is formed at the other side of the upper surface of the ejecting bar and is continuously connected with the first stepped recess portion, and has a step height higher than that of the first stepped recess portion, and wherein, before the tray is inserted, the plate spring portion is in contact with the first stepped recess portion and a first overlap is formed between the plate spring portion and the ejecting bar, and, after the tray is inserted, the plate spring portion is brought into contact with the second stepped recess portion and a second overlap is formed between the plate spring portion and the ejecting bar, wherein the second overlap is larger than the first overlap, such that a relatively great pressure of the plate spring portion is exerted to the ejecting bar and a movement of the ejecting bar is prevented.

6. A card socket for an electronic device, the card socket comprising:

a socket housing which has a space, the socket housing being configured to have a tray inserted into the space, the tray being configured to have a card mounted therein;

a socket cover which is installed on an upper portion of the socket housing;

an ejecting hinge portion which is rotatably coupled to a first side of the socket housing by a hinge, wherein when the ejecting hinge portion is rotated in a first direction, the ejecting hinge portion is configured to push the tray in a forward direction to allow for removal of the tray from the space;

an ejecting bar which is installed on a second side of the socket housing, the ejecting bar being configured to be movable in forward and backward directions, the ejecting bar being connected to the ejecting hinge portion, wherein, upon movement of the ejecting bar in the forward direction, the ejecting bar causes the ejecting hinge portion to rotate in a second direction, and wherein, upon movement of the ejecting bar in the backward direction, the ejecting bar causes the ejecting hinge portion to rotate in the first direction; and a hinge breakage preventing protrusion which protrudes from one side surface of a hinge shaft of the ejecting hinge portion facing an insertion direction of the tray, and wherein, when the socket cover is assembled, the hinge breakage preventing protrusion corrects a position of the ejecting hinge portion so as to make a gap between the socket cover and the ejecting hinge portion, and thus not to cause mutual collision interference between the socket cover and the ejecting hinge portion, such that breakage of the hinge shaft of the ejecting hinge portion is prevented.

* * * * *